US011175043B2

(12) United States Patent
Takiguchi et al.

(10) Patent No.: US 11,175,043 B2
(45) Date of Patent: Nov. 16, 2021

(54) BURNER ASSEMBLY, COMBUSTOR, AND GAS TURBINE

(71) Applicant: MITSUBISHI HEAVY INDUSTRIES, LTD., Tokyo (JP)

(72) Inventors: Satoshi Takiguchi, Tokyo (JP); Keijiro Saito, Tokyo (JP); Satoshi Tanimura, Kanagawa (JP); Shinji Akamatsu, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 141 days.

(21) Appl. No.: 16/082,448

(22) PCT Filed: Mar. 6, 2017

(86) PCT No.: PCT/JP2017/008727
§ 371 (c)(1),
(2) Date: Sep. 5, 2018

(87) PCT Pub. No.: WO2017/154821
PCT Pub. Date: Sep. 14, 2017

(65) Prior Publication Data
US 2019/0086089 A1  Mar. 21, 2019

(30) Foreign Application Priority Data
Mar. 7, 2016  (JP) .............................. JP2016-043027

(51) Int. Cl.
*F23R 3/14* (2006.01)
*F23R 3/32* (2006.01)
(Continued)

(52) U.S. Cl.
CPC .................. *F23R 3/14* (2013.01); *F02C 3/04* (2013.01); *F23D 23/00* (2013.01); *F23R 3/18* (2013.01);
(Continued)

(58) Field of Classification Search
CPC ...... F23R 3/12; F23R 3/14; F23R 3/34; F23R 3/286; F23R 3/343; F23R 2900/00014;
(Continued)

(56) References Cited

U.S. PATENT DOCUMENTS 6,038,861 A * 3/2000 Amos ..................... F23R 3/286
239/428
6,122,916 A    9/2000 Amos et al.
(Continued)

FOREIGN PATENT DOCUMENTS

CN    101029742     9/2007
CN    101876437     11/2010
(Continued)

OTHER PUBLICATIONS

Chinese Office Action dated Sep. 18, 2019 in corresponding Chinese Patent Application No. 201780015471.1 with Machine Translation.
(Continued)

*Primary Examiner* — Todd E Manahan
*Assistant Examiner* — David P. Olynick
(74) *Attorney, Agent, or Firm* — Wenderoth, Lind & Ponack, L.L.P.

(57) ABSTRACT

A burner assembly for a combustor includes: a plurality of first nozzles arranged in a circumferential direction of the combustor; a plurality of first burner cylinders accommodating the respective first nozzles; and a middle-flow-passage forming portion which is connected to a downstream end of the plurality of first burner cylinders and which forms a middle flow passage through which a combustion chamber of the combustor is in communication with an interior space of each of the plurality of first burner cylinders. The middle-flow-passage forming portion includes an inner peripheral wall disposed on a radially inner side of the combustor and formed such that a distance from a center axis of the
(Continued)

combustor to the inner peripheral wall is uneven with respect to the circumferential direction.

14 Claims, 7 Drawing Sheets

(51) Int. Cl.
    *F23R 3/28*     (2006.01)
    *F23R 3/18*     (2006.01)
    *F02C 3/04*     (2006.01)
    *F23D 23/00*     (2006.01)
    *F23R 3/20*     (2006.01)

(52) U.S. Cl.
    CPC .................. *F23R 3/20* (2013.01); *F23R 3/28* (2013.01); *F23R 3/32* (2013.01); *F05D 2240/35* (2013.01); *F23D 2206/10* (2013.01)

(58) Field of Classification Search
    CPC .......... F23R 3/20; F23R 3/32; F23D 2210/00; F23D 11/12; F23D 11/38; F23D 11/381; F23D 11/103; F23D 11/105; F23D 2206/10; F23D 23/00; F02C 3/04; F05D 2240/35
    See application file for complete search history.

(56) References Cited

U.S. PATENT DOCUMENTS

| | | |
|---|---|---|
| 7,540,152 B2 | 6/2009 | Tanimura et al. |
| 8,234,872 B2 | 8/2012 | Berry et al. |
| 2008/0184708 A1* | 8/2008 | Moriwaki ................. F23R 3/12 60/747 |
| 2012/0288360 A1 | 11/2012 | Kuwamura et al. |
| 2013/0125550 A1* | 5/2013 | Prade ...................... F23R 3/343 60/740 |
| 2014/0083102 A1 | 3/2014 | Miura et al. |

FOREIGN PATENT DOCUMENTS

| | | |
|---|---|---|
| CN | 103672965 | 3/2014 |
| DE | 698 04 022 | 8/2002 |
| EP | 2 416 070 | 2/2012 |
| JP | 8-14562 | 1/1996 |
| JP | 09-042672 | 2/1997 |
| JP | 2003-517553 | 5/2003 |
| JP | 2005-114193 | 4/2005 |
| JP | 2013-190196 | 9/2013 |
| KR | 2001-0033845 | 4/2001 |
| WO | 99/06767 | 2/1999 |

OTHER PUBLICATIONS

International Search Report dated May 9, 2017 in International (PCT) Application No. PCT/JP2017/008727, with English-language translation.
International Preliminary Report on Patentability dated Sep. 20, 2018 in International (PCT) Application No. PCT/JP2017/008727, with English-language translation.
Japanese Office Action dated Jan. 7, 2020 in corresponding Japanese Patent Application 2016-043027 with Machine translation.
Japanese Office Action dated Sep. 10, 2019 in corresponding Japanese Patent Application No. 2016-043027 with Machine Translation.
Korean Office Action dated Sep. 11, 2019 in corresponding Korean Application No. 10-2018-7025438 with Machine Translation.
Korean Office Action dated May 28, 2020 in corresponding Korean Patent Application No. 10-2018-7025438 with Machine Translation.

* cited by examiner

BURNER ASSEMBLY, COMBUSTOR, AND GAS TURBINE

TECHNICAL FIELD

The present disclosure relates to a burner assembly including a plurality of nozzles and a burner cylinder, a combustor, and a gas turbine.

BACKGROUND ART

Typically, a known burner assembly of a combustor includes a plurality of nozzles and a burner cylinder arranged in the circumferential direction of the combustor.

For instance, Patent Documents 1 and 2 disclose a burner assembly including a pilot burner for diffusion combustion and a plurality of main burners for pre-mixed combustion, disposed around the pilot burner. Further, Patent Document 2 discloses improving the flame holding performance by mixing a swirl flow formed by a swirler provided for the main burner and a recirculation flow that returns to the main burner in the combustion chamber.

CITATION LIST

Patent Literature

Patent Document 1: JP2005-114193A
Patent Document 2: JP2013-190196A

SUMMARY

Problems to be Solved

A burner assembly of the combustor is required to maintain a high combustion stability. That is, it is required to form a flame having an appropriate size at an appropriate position in the combustion chamber continuously. However, with a typical burner assembly as disclosed in Patent Documents 1 and 2, local abnormal heat generation due to concentration of a flame and combustion oscillation due to variation of the flame position may occur, and combustion may become unstable.

In view of the above, an object of at least some embodiments of the present invention is to provide a burner assembly, a combustor, and a gas turbine, whereby it is possible to maintain a high combustion stability.

Solution to the Problems (1) A burner assembly for a combustor according to at least some embodiments of the present invention includes: a plurality of first nozzles arranged in a circumferential direction of the combustor; a plurality of first burner cylinders accommodating the respective first nozzles; and a middle-flow-passage forming portion which is connected to a downstream end of the plurality of first burner cylinders and which forms a middle flow passage through which a combustion chamber of the combustor is in communication with an interior space of each of the plurality of first burner cylinders. The middle-flow-passage forming portion includes an inner peripheral wall disposed on a radially inner side of the combustor and formed such that a distance from a center axis of the combustor to the inner peripheral wall is uneven with respect to the circumferential direction.

With the above configuration (1), in the region where the distance from the center axis of the combustor to the inner peripheral wall of the middle-flow-passage forming portion changes, the radial directional flow velocity of the fluid flow along the inner peripheral wall of the region is not uniform in the circumferential direction. Thus, in this region, longitudinal vortices are formed within a plane that is orthogonal to the axial direction of the combustor. Thus, on the downstream side of the middle-flow-passage forming portion, mixing of the flow accompanied by the longitudinal vortex component from the first burner cylinder and the gas flow (e.g. recirculation gas) in the combustion chamber is promoted, which makes it possible to improve the flame stability in the burner assembly.

Accordingly, it is possible to stabilize combustion by the burner assembly, and thus to suppress combustion oscillation and prevent abnormal heat generation.

(2) In some embodiments, in the above configuration (1), the burner assembly further includes: a second nozzle disposed so as to be surrounded by the plurality of first nozzles; a second burner cylinder accommodating the second nozzle; and a cone portion connected to a downstream end of the second burner cylinder, the cone portion having a diameter which increases toward a downstream side from a diameter of the downstream end of the second burner cylinder. The cone portion includes a flange which is positioned on a downstream end of the cone portion and which extends outward in a radial direction of the combustor, and the flange has, with respect to the radial direction of the combustor, a height which is uneven in the circumferential direction.

With the above configuration (2), the cone portion connected to the downstream end of the second burner cylinder has a flange extending toward the outer side in the radial direction of the combustor. The flange forms a flame holding region. That is, on the downstream side of the flange, formed is a reverse flow region where a part of the flow of a fluid from the second burner cylinder or the first burner cylinder flows in the opposite direction, or a low-velocity region where the flow velocity is low. Accordingly, the flame holding performance is improved.

Further, with the above configuration (2), the flange is formed so that the height of the flange in the radial direction of the combustor is not uniform with respect to the circumferential direction. Thus, the flow in the flame holding region (reverse flow region or low-velocity region) formed downstream of the flange is not uniform in the circumferential direction, and the flame position in the combustion chamber is fixed in the circumferential direction, which makes it possible to improve the flame holding performance more effectively.

(3) In some embodiments, in the above configuration (1) or (2), the middle-flow-passage forming portion includes: an inner ring 22 which is disposed on a downstream side of the plurality of first burner cylinders and which extends in the circumferential direction; and an outer ring 23 which is disposed on a downstream side of the plurality of first burner cylinders and on a radially outer side of the inner ring 22 and which extends in the circumferential direction so as to form the middle flow passage having an annular shape between the inner ring 22 and the outer ring 23. A distance from the center axis of the combustor to the inner ring 22 is uneven with respect to the circumferential direction.

In the above configuration (3), the middle-flow-passage forming portion includes the inner ring 22 and the outer ring 23, and the annular middle flow passage is formed between the inner ring 22 and the outer ring 23. The annular middle flow passage has a high fluid mixing performance, and further in this configuration, longitudinal vortices are formed by the configuration in which the distance from the center axis of the combustor to the inner ring 22 is not uniform with respect to the circumferential direction. Accordingly, it is possible to stabilize combustion even further.

(4) In some embodiments, in the above configuration (1) or (2), the middle-flow-passage forming portion includes a plurality of middle ducts 25 each of which is disposed on a downstream side of a corresponding one of the plurality of first burner cylinders, and is in communication with an interior space of the corresponding one of the plurality of first burner cylinders. A radially inner portion of each of the middle ducts 25 with respect to a radial direction of the combustor is configured such that a distance from the center axis of the combustor to the radially inner portion of the middle duct 25 is uneven with respect to the circumferential direction.

With the above configuration (4), for the middle ducts 25 positioned downstream of the first burner cylinder, the distance from the center axis of the combustor from a portion of each of the middle ducts 25 on the radially inner side of the combustor is not uniform with respect to the circumferential direction. Accordingly, it is possible to stabilize combustion by forming longitudinal vortices in the configuration where the middle ducts 25 are provided to bring the first burner cylinders and the combustion chamber of the combustor into communication.

(5) In some embodiments, in any one of the above configurations (1) to (4), the inner peripheral wall of the middle-flow-passage forming portion has an uneven portion with respect to the circumferential direction.

With the above configuration (5), it is possible to form the above described longitudinal vortices effectively, with the uneven portion of the inner peripheral wall of the middle-flow-passage forming portion. That is, the flow along the uneven portion of the inner peripheral wall generates longitudinal vortices within a plane orthogonal to the axial direction of the first burner cylinder. For instance, a longitudinal vortex is a flow that flows outward in the radial direction along the oblique surface of the protruding portion, and then returns inward in the radial direction at the outer peripheral wall of the middle-flow-passage forming portion, within a plane orthogonal to the axial direction of the first burner cylinder.

With the longitudinal vortices formed by the uneven portion, on the downstream side of the middle-flow-passage forming portion, mixing of the flow accompanied by the longitudinal vortex component from the first burner cylinder and the gas flow (e.g. recirculation gas) in the combustion chamber is promoted, which makes it possible to improve the flame stability in the burner assembly.

(6) In some embodiments, in the above configuration (5), the burner assembly further includes a plurality of first swirlers each of which is disposed on a corresponding one of the first burner cylinders, for imparting a swirl to an air flow flowing through the corresponding first burner cylinder. The inner peripheral wall is configured such that a circumferential position of a vertex point of the uneven portion at which the distance from the center axis of the combustor is maximum is offset toward a downstream side of a swirl flow along the inner peripheral wall formed by the first swirler from a swirl center of the first swirler disposed on an upstream side of the circumferential position (upstream side in the axial direction of the combustor).

With the above configuration (6), the circumferential position of the vertex portion of the uneven portion disposed on the inner peripheral wall is offset toward downstream with respect to the swirl flow along the inner peripheral wall, with respect to the swirl center of the first swirler. Accordingly, it is possible to form the above described longitudinal vortices effectively, through mutual effect between the swirl component due to the first swirler and the longitudinal vortex component due to the unevenness of the inner peripheral wall.

(7) In some embodiments, in the above configuration (4), the radially inner portion of each of the middle ducts 25 has such a shape that a distance from the center axis of the combustor to the radially inner portion of the middle duct 25 increases gradually from a first end side toward a second end side in the circumferential direction.

With the above configuration (7), a radially inner portion of the middle duct 25 has such a shape that, from a first end toward a second end in the circumferential direction, the distance from the center axis of the combustor to the radially inner portion of the middle duct 25 increases gradually, and thus it is possible to form the above described longitudinal vortices with the radially inner portion of the middle duct 25 without increasing the complexity of the shape of the middle duct 25.

(8) In some embodiments, in the above configuration (7), the burner assembly further includes a plurality of first swirlers each of which is disposed on a corresponding one of the first burner cylinders, for imparting a swirl to an air flow flowing through the corresponding first burner cylinder. The radially inner portion of each of the middle ducts 25 has such a shape that a distance from the center axis increases gradually toward a downstream side of a swirl flow along the radially inner portion of the middle duct 25 formed by the first swirler.

In the above configuration (8), a portion on the radially inside of the middle duct 25 has such a shape that, toward the downstream side with respect to the swirl flow along the portion formed by the first swirler, the distance from the center axis of the combustor increases gradually. Accordingly, it is possible to form the above described longitudinal vortices effectively, through mutual effect between the swirl component formed due to the first swirler and the longitudinal vortex component due to the portion on the radially inner side of the middle duct 25.

(9) In some embodiments, in any one of the above configurations (1) to (8), each of the first nozzles comprises a premixing nozzle configured to combust a premixed air-fuel mixture of an air flow supplied to the first burner cylinder and a fuel supplied from the first nozzle.

In premixing combustion using a premixing nozzle as the first nozzle as in the above configuration (9), it is known that, while emission of NOx can be normally reduced, combustion becomes rather unstable. Thus, providing any one of the above configurations (1) to (8) makes it is possible to stabilize combustion, and provide a burner assembly that can achieve both of low NOx emission and stable combustion.

(10) A combustor according to at least some embodiments of the present invention includes: the burner assembly according to any one of (1) to (9); and a combustor liner accommodating the burner assembly.

With the above combustor (10), a burner assembly capable of stable combustion is provided, and thus it is possible to provide a combustor with a high reliability.

(11) A gas turbine according to at least some embodiments of the present invention includes: a compressor; the combustor according to the above (10) configured to combust fuel by using compressed air generated by the compressor; and a turbine driven by combustion gas generated by the combustor.

With the above gas turbine (11), a burner assembly capable of stable combustion is provided, and thus it is possible to provide a gas turbine with a high reliability.

Further, the gas turbine may include a plurality of burner assemblies according to the above (10).

Advantageous Effects

According to at least some embodiments of the present invention, the flame position inside the combustion chamber is fixed in the circumferential direction, and it is possible to stabilize combustion. Further, through stabilization of combustion, it is possible to suppress combustion oscillation and prevent abnormal heat generation.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, with reference to FIGS. 1 to 7, the common configuration of a burner assembly 1 according to some embodiments will be described.

Figure 1:
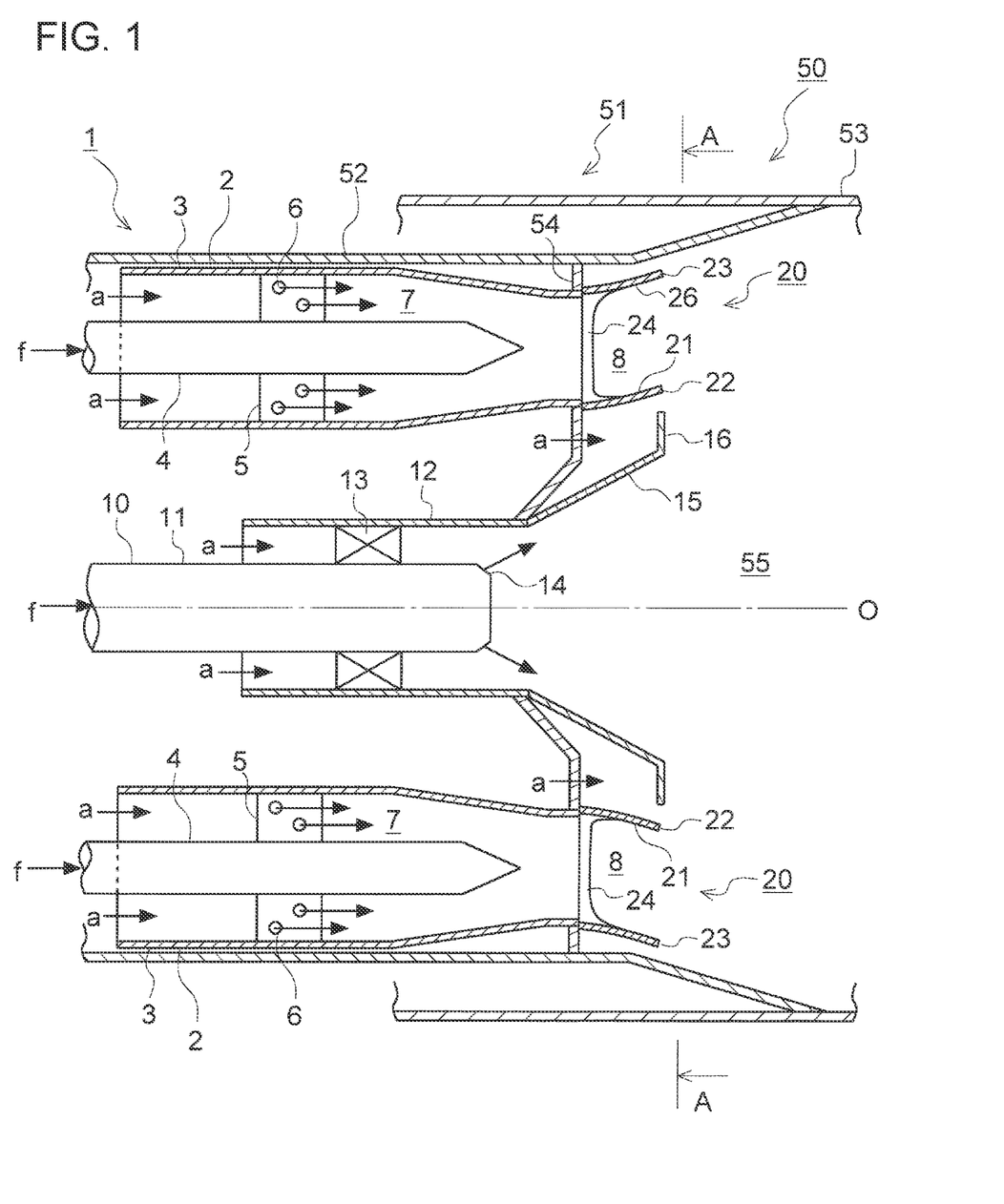
FIG. 1 is a side view of a burner assembly according to an embodiment.
Figure 2:
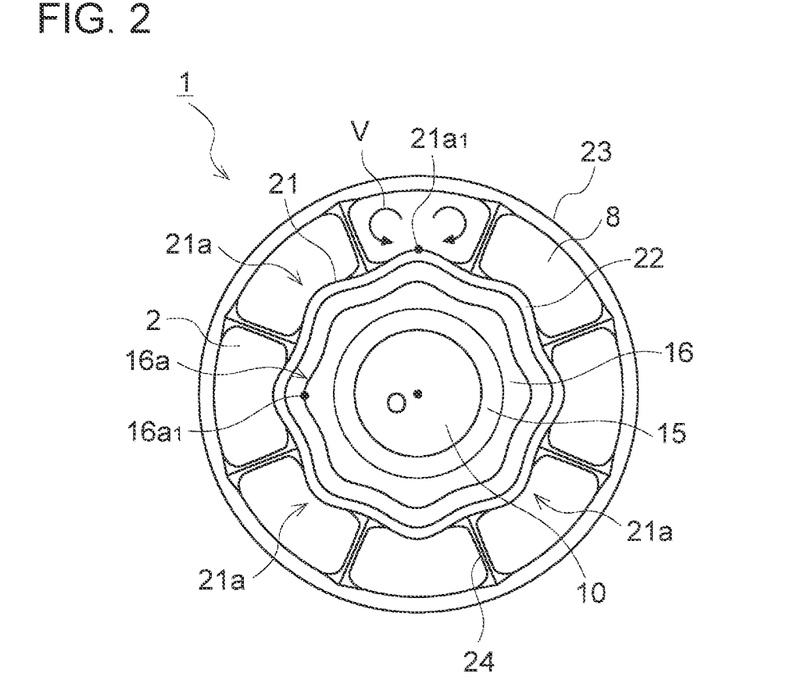
FIG. 2 is a front view of a burner assembly according to an embodiment (A-A arrow view of FIG. 1).
Figure 5:
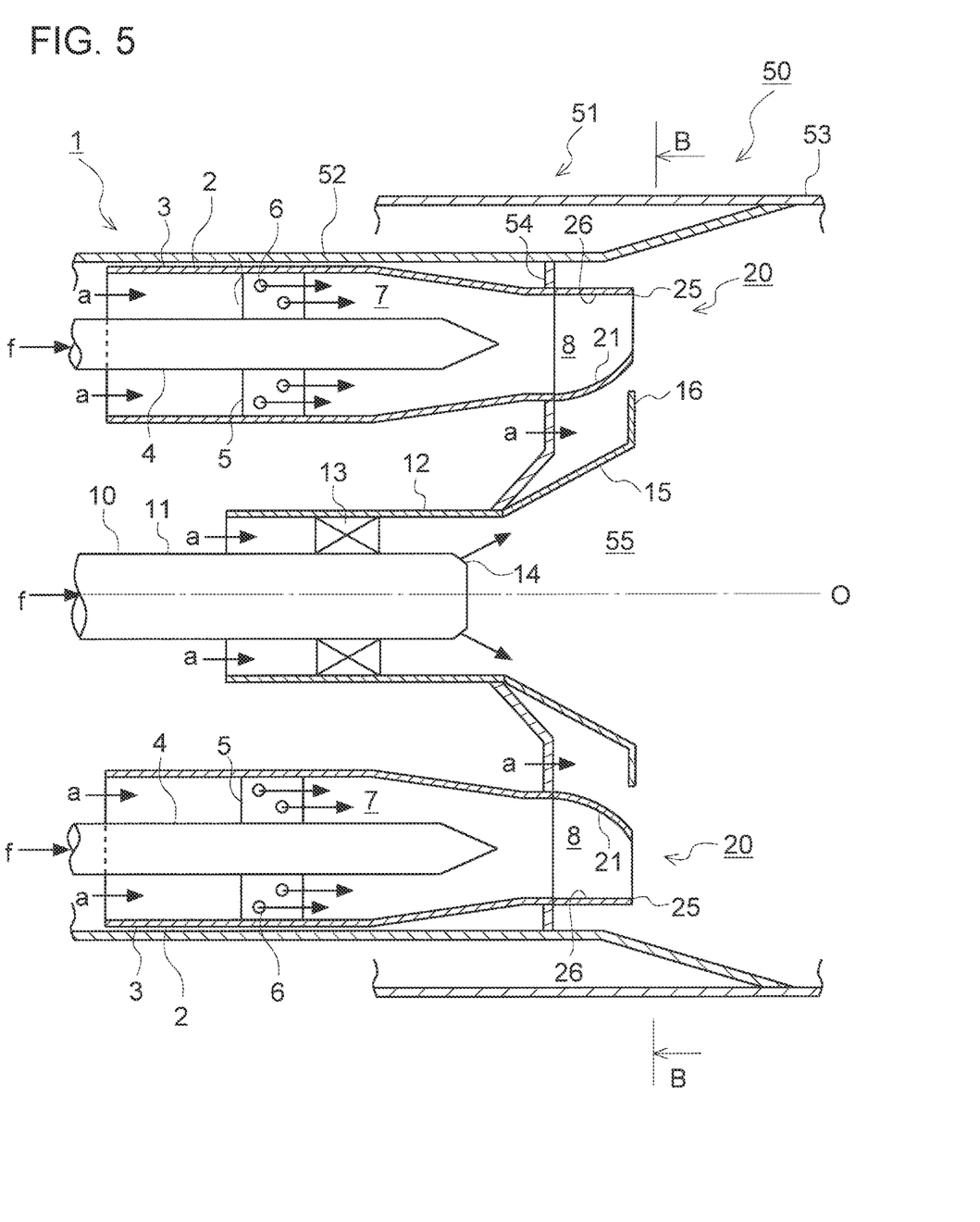
FIG. 5 is a side view of a burner assembly according to another embodiment.
Figure 6:
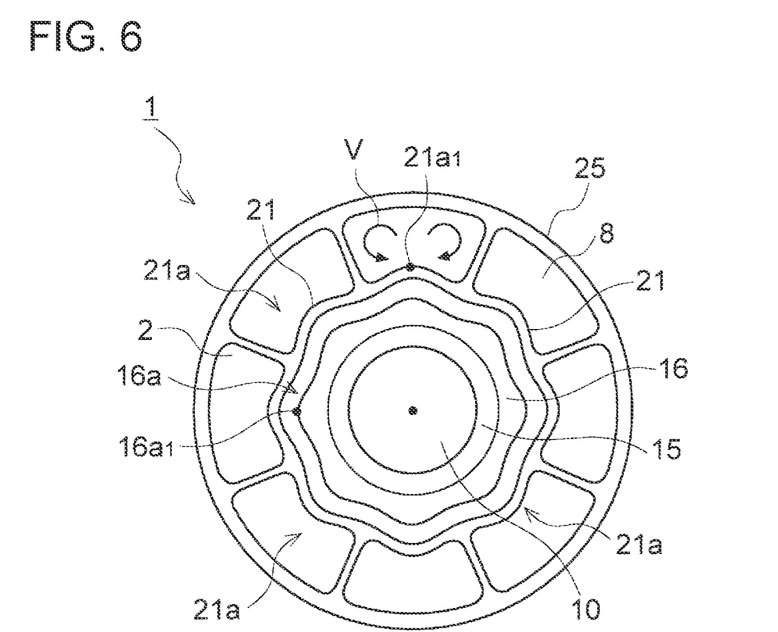
FIG. 6 is a front view of a burner assembly according to another embodiment (B-B arrow view of FIG. 5).

FIG. 1 is a side view of a burner assembly 1 according to an embodiment. FIG. 2 is a front view of a burner assembly 1 according to an embodiment (A-A arrow view of FIG. 1). FIG. 5 is a side view of a burner assembly 1 according to another embodiment. FIG. 6 is a front view of a burner assembly 1 according to another embodiment (B-B arrow view of FIG. 5).

Figure 7:
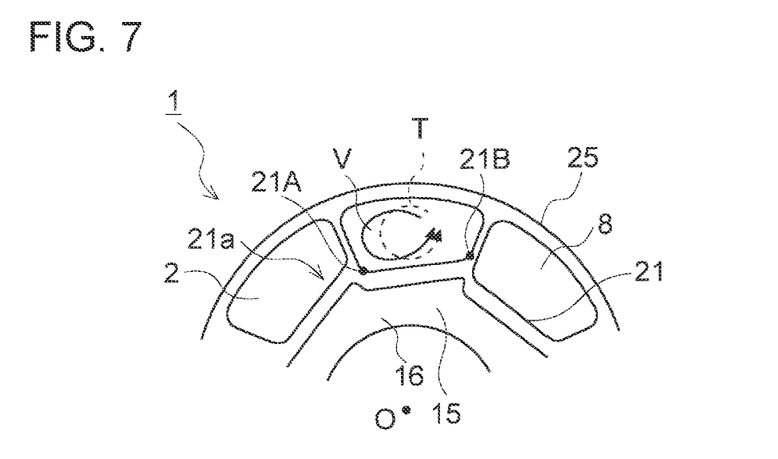
FIG. 7 is a diagram showing a modified example of FIG. 6.

In FIGS. 1 to 7, two embodiments of the burner assembly 1 are shown as examples. The burner assembly 1 according to an embodiment shown in FIGS. 1 to 4 and the burner assembly 1 according to another embodiment shown in FIGS. 5 to 7 are different from each other, mainly in the configuration of a middle-flow-passage forming portion 20 disposed between a first burner cylinder 3 and a combustor liner 51.

In the following description, the circumferential direction of the combustor 50 is referred to as merely "circumferential direction", the axial direction of the combustor 50 is referred to as merely "axial direction" (usually, same as the axial direction of the first burner cylinder 3), and the radial direction of the combustor 50 is referred to as merely "radial direction". Further, "upstream side" and "downstream side" refer to the upstream side and the downstream side, respectively, with respect to the flow direction of a fluid (e.g. fuel, air, or fluid mixture of fuel and air).

As shown in FIGS. 1, 2, 5, and 6, in some embodiments, the burner assembly 1 of the combustor 50 includes a plurality of first nozzles 4 arranged in the circumferential direction of the combustor 50, a plurality of first burner cylinders 3 housing the respective first nozzles 4, and a middle-flow-passage forming portion 20 connected to a downstream end of the plurality of first burner cylinders 3.

The middle-flow-passage forming portion 20 is configured to form a middle flow passage 8 which brings an interior space 7 of each of the plurality of first burner cylinders 3 and a combustion chamber 55 of the combustor 50 into communication. Further, the middle-flow-passage forming portion 20 includes an inner peripheral wall 21 positioned on the inner side of the combustor 50 with respect to the radial direction, and an outer peripheral wall 26 disposed on the outer side with respect to the radial direction.

The distance to the inner peripheral wall 21 of the middle-flow-passage forming portion 20 from the center axis O of the combustor 50 is not uniform in the circumferential direction.

In an embodiment, the burner assembly 1 includes a plurality of first burners 2 each of which includes a first nozzle 4 and a first burner cylinder 3. For example, the first burner 2 is a pre-mixing combustion burner. In this case, each of the first nozzles 4 (pre-mixed combustion nozzle) is configured to pre-mix and combust an air flow 'a' supplied to the first burner cylinder 3 and a fuel 'f' supplied from the first nozzles 4.

However, the first burner 2 is not limited to a pre-mixing combustion burner.

The plurality of first burner cylinders 3 each have a cylindrical shape, and at least a downstream end portion of the middle-flow-passage forming portion 20 may have a non-cylindrical shape. That is, of a flow passage of a fluid containing a fuel flowing toward the combustion chamber 55, the middle-flow-passage forming portion 20 is a portion forming a flow passage having a cross section taken in a direction orthogonal to the axial direction, which deforms in the flow direction.

The middle-flow-passage forming portion 20 may be formed as a separate member from the first burner cylinder 3 as shown in FIGS. 1 and 5, or may be integrally formed with the first burner cylinder 3 although not depicted.

In the above configuration, a fluid containing a fuel flows downstream through the interior space 7 of the first burner cylinder 3, and enters the middle flow passage 8 formed by the middle-flow-passage forming portion 20. In the region where the distance from the center axis O of the combustor 50 to the inner peripheral wall 21 of the middle-flow-passage forming portion 20 changes, the radial directional flow velocity of the fluid flow along the inner peripheral wall 21 of the region is not uniform with respect to in the circumferential direction. Thus, in this region, longitudinal vortices V (see FIGS. 6 and 7) are formed within a plane that is orthogonal to the axial direction of the combustor 50. Thus, on the downstream side of the middle-flow-passage forming portion 20, mixing of the flow accompanied by the longitudinal vortex component from the first burner cylinder 3 and the gas flow in the combustion chamber 55 is promoted, which makes it possible to improve the flame stability in the burner assembly 1.

Accordingly, it is possible to stabilize combustion by the burner assembly 1, and thus to suppress combustion oscillation and prevent abnormal heat generation.

Further, in a case where each of the first nozzles 4 is a pre-mixing nozzle, it is possible to obtain a burner assembly 1 that can achieve both of low NOx emission and stable combustion.

Further, as shown in FIG. 1 or 5, the inner peripheral wall 21 of the middle-flow-passage forming portion 20 may be oblique with respect to the axial direction such that the downstream end portion is positioned on the outer side of the upstream end portion with respect to the radial direction. In this case, the inner peripheral wall 21 may be oblique in a linear fashion, or in a curved fashion with the curvature center positioned on the outer side with respect to the radial direction.

Accordingly, the fluid flowing through the middle flow passage 8 flows biased toward the inner peripheral wall 21, and thus the flow in the middle flow passage 8 is more likely to be affected by the shape of the inner peripheral wall 21, which makes it possible to further enhance the flame stability of the burner assembly 1.

Further, the burner assembly 1 according to some embodiments includes a second nozzle 11 disposed surrounded by the plurality of first nozzles 4, a second burner cylinder 1 housing the second nozzle 11, and a cone portion 15 connected to the downstream end of the second burner cylinder 12.

The burner assembly 1 includes a second burner 10 including the second nozzle 11 and the second burner cylinder 12. For example, the second burner 10 is a diffusion combustion burner. In this case, the second nozzle 11 (diffusion combustion nozzle) is configured to perform diffusion combustion by injecting a fuel toward the combustion chamber 55 from the downstream end portion.

However, the second nozzle 11 is not limited to a diffusion combustion nozzle, and may be another type of nozzle such as a pre-mixing combustion nozzle.

The cone portion 15 is formed to have a diameter which increases toward the downstream side from the diameter of the downstream end of the second burner cylinder 12, and has a flange 16 on the downstream end. The flange 16 extends outward in the radial direction of the combustor 50 from the downstream end of the cone portion 15.

The height of the flange 16 in the radial direction of the combustor 50 is not uniform with respect to the circumferential direction.

In the above configuration, the cone portion 15 connected to the downstream end of the second burner cylinder 12 has a flange 16 extending toward the outer side in the radial direction of the combustor 50. The flange 16 forms a flame holding region. That is, on the downstream side of the flange 16, formed is a reverse flow region where a part of the flow of a fluid from the second burner cylinder 12 or the first burner cylinder 3 flows in the opposite direction, or a low-velocity region where the flow velocity is low. Accordingly, the flame holding performance is improved.

Further, with the above configuration, the flange 16 is formed so that the height of the flange 16 in the radial direction of the combustor 50 is not uniform with respect to the circumferential direction. Thus, the flow in the flame holding region (vertical flow region or low-velocity region) formed downstream of the flange 16 is not uniform in the circumferential direction, and the flame position in the combustion chamber 55 is fixed in the circumferential direction, which makes it possible to improve the flame holding performance more effectively.

Further, the burner assembly 1 may further include a plurality of first swirlers 5 for imparting swirl to the air flow flowing through each of the first burner cylinders 3, provided for the respective first burner cylinders 3.

The plurality of first swirlers 5 are configured to form swirl flows in the same direction, inside the first burner cylinders 3. With the first swirlers 5, it is possible to form a reverse flow region inside the combustion chamber 55 effectively.

More specifically, the configuration of the combustor 50 and the burner assembly 1 according to the embodiments shown in FIGS. 1, 2, 5, and 6 will be described in detail.

The combustor 50 includes the burner assembly 1, and the combustor liner 51 housing the burner assembly 1.

The precombustion chamber 55 is formed inside the combustor liner 51. For instance, the combustor liner 51 includes a combustor basket 52 having a cylindrical shape disposed around the first burner 2, and a transition piece 53 connected to a downstream end portion of the combustor basket 52. In this case, the combustion chamber 55 is formed inside the transition piece 53.

Further, the overall configuration of the combustor 50 will be described in detail below also with reference to FIG. 9.

Inside the combustor liner 51, a plurality of first burners 2 (eight in FIGS. 2 and 6) arranged in the circumferential direction and a single second burner 10 disposed surrounded by the plurality of first burners 2 are provided. Further, inside the combustor liner 51, a base plate 54 supporting the first burner 2 and the second burner 10, and a middle-flow-passage forming portion 20 disposed between the first burner 2 and the combustion chamber 55 are provided.

The plurality of first burners 2 are disposed at regular intervals in the circumferential direction of the combustor 50.

The first burners 2 include the first burner cylinders 3 and the first nozzles 4. The first burner cylinders 3 are each formed into a cylindrical shape. Each of the first burner cylinders 3 accommodates corresponding one of the first nozzles 4, and the first swirler 5 is disposed between the first nozzle 4 and the first burner cylinder 3. The first nozzle 4 or the first swirler 5 is provided with a fuel injection hole 6.

The middle-flow-passage forming portion 20 is connected to the downstream end of the plurality of first burner cylinders 3, and configured to form a middle flow passage 8 which brings an interior space 7 of each of the plurality of first burner cylinders 3 and a combustion chamber 55 of the combustor 50 into communication. In an embodiment shown in FIGS. 1 and 2, the middle-flow-passage forming portion 20 includes an inner ring 22 and an outer ring 23. In another embodiment shown in FIGS. 5 and 6, the middle-flow-passage forming portion 20 includes a middle duct 25. In any one of the embodiments, the middle-flow-passage forming portion 20 forms a flow passage having a cross section taken in a direction orthogonal to the axial direction, which deforms in the flow direction, of a flow passage of a fluid containing a fuel flowing toward the combustion chamber 55.

The second burner 10 is disposed in the center of the combustor liner 51, and includes the second burner cylinder 12 and the second nozzle 11. The second burner cylinder 12 is formed into a cylindrical shape. The second burner cylinder 12 accommodates the second nozzle 11, and the second swirler 13 is disposed between the second nozzle 11 and the second burner cylinder 12. The cone portion 15 is connected to the downstream end of the second burner cylinder 12. The diameter of the cone portion 15 increases in a tapered manner from the downstream end of the second burner cylinder 12 toward the further downstream side. The cone portion 15 extends over the entire periphery of the second burner cylinder 12. A fuel injection hole 14 is disposed on the downstream end portion of the second nozzle 11.

The cone portion 15 is a cone-shaped tube expanding outward in the radial direction from the upstream end portion toward the downstream end portion, and the upstream end portion of the cone portion 15 is connected to the downstream end portion of the second burner cylinder 12. The flange 16 extending outward in the radial direction is connected to the downstream end of the cone portion 15. For instance, the flange 16 is disposed along a plane orthogonal to the axial direction. The flange 16 has a flame holding function which enhances the flame holding performance by forming a reverse flow region or a low-velocity region on the downstream side. For instance, in a case where the first burner 2 is a pre-mix combustion burner, it is possible to maintain the pre-mix combustion ignited by a diffusion flame, through the flame holding function of the flange 16.

Further, the height of the flange 16 in the radial direction of the combustor 50 is not uniform with respect to the circumferential direction.

With the burner assembly 1 having the above described configuration, in the second burner 10 (diffusion combustion burner, for example), air 'a' supplied into the second burner cylinder 12 is turned into a swirl flow by the second swirler 13 while flowing through the second burner cylinder 12, and is injected into the cone portion 15. On the other hand, the fuel 'f' supplied into the second nozzle 11 is injected into the cone portion 15 from the fuel injection hole 14 on the tip of the second nozzle 11. Accordingly, the air 'a' and the fuel 'f' are mixed inside the cone portion 15, and the air-fuel mixture is ignited by an ignition device (not depicted), and thereby diffusion combustion is performed inside the cone portion 15 and the combustion chamber 55.

In the first burner 2 (pre-mix combustion burner, for example), air 'a' supplied into the first burner cylinder 3 is turned into a swirl flow by the first swirler 5 while flowing through the first burner cylinder 3. On the other hand, the fuel 'f' supplied into the first nozzle 4 passes through the first nozzle 4 and the first swirler 5, and is injected into the first burner cylinder 3 from the fuel injection hole 6 of the first nozzle 4 or the first swirler 5. The air 'a' and the fuel 'f' are pre-mixed in the first burner cylinder 3 and the middle-flow-passage forming portion 20, and the premixed air-fuel mixture is injected into the combustion chamber 55. In the combustion chamber 55, the diffusion flame produced by the second burner 10 is utilized as a pilot light, and thereby the pre-mixed air-fuel mixture injected into the combustion chamber 55 is ignited, and the pre-mix combustion is performed.

At this time, in the region where the distance from the center axis O of the combustor 50 to the inner peripheral wall 21 of the middle-flow-passage forming portion 20 changes, the radial directional flow velocity of the flow along the inner peripheral wall 21 of the region is not uniform in the circumferential direction, and longitudinal vortices V are generated within a plane orthogonal to the axial direction of the combustor 50. Further, on the downstream side of the middle-flow-passage forming portion 20, mixing of the flow accompanied by the longitudinal vortex component from the first burner cylinder 3 and the gas flow in the combustion chamber 55 is promoted, which makes it possible to improve the flame stability in the burner assembly 1.

Further, at this time, in the cone portion 15, a reverse flow or speed reduction is caused for a part of pre-mixed air-fuel mixture discharged from the middle-flow-passage forming portion 20 or a part of air-fuel mixture discharged from the cone portion 15, at the flange 16, and thereby it is possible to maintain the pre-mix combustion ignited by the diffusion flame reliably.

Furthermore, the flange 16 is formed so as to have an uneven height in the radial direction of the combustor 50, and thus the flow in the flame holding region formed downstream of the flange 16 becomes not uniform in the circumferential direction, and the flame position in the combustion chamber 55 is fixed in the circumferential direction, which makes it possible to improve the flame holding performance more effectively.

Next, a specific configuration example of the middle-flow-passage forming portion 20 according to each embodiment will be described.

In the embodiment shown in FIGS. 1 and 2, the middle-flow-passage forming portion 20 includes an inner ring 22 extending in the circumferential direction disposed on the downstream side of the plurality of first burner cylinders 3, and an outer ring 23 extending in the circumferential direction so as to form an annular middle flow passage 8 together with the inner ring 22, disposed on the downstream side of the plurality of first burner cylinders 3 and on the radially outer side of the inner ring 22. Furthermore, the middle-flow-passage forming portion 20 may include a stagnation suppressing part 24 disposed so as to be positioned between internal passages of adjacent first burner cylinders 3, on the upstream end side of the middle-flow-passage forming portion 20. The stagnation suppressing part 24 may have a width that decreases toward the downstream side. Accordingly, it is possible to suppress stagnation of the flow flowing into the middle flow passage 8 from the interior space 7 of the first burner cylinder 3, at the downstream end of the first burner cylinder 3.

As shown in FIG. 1, the inner ring 22 may be formed to increase in diameter from the upstream end toward the downstream end. That is, the inner ring 22 may be formed into a cone shape corresponding to the outer peripheral surface of the cone portion 15. Further, similarly to the inner ring 22, the outer ring 23 may be formed to increase in diameter from the upstream end toward the downstream end. In this case, the inclination angle of the inner ring 22 with respect to the axial direction and the inclination angle of the outer ring 23 with respect to the axial direction may be substantially the same.

Further, in this configuration, the distance to the inner ring 22 from the center axis O of the combustor 50 is not uniform in the circumferential direction.

In the above configuration, the middle-flow-passage forming portion 20 includes the inner ring 22 and the outer ring 23, and the annular middle flow passage 8 is formed between the inner ring 22 and the outer ring 23. The annular middle flow passage 8 has a high fluid mixing performance, and further in this configuration, longitudinal vortices are formed by the configuration in which the distance from the center axis O of the combustor 50 to the inner ring 22 is not uniform with respect to the circumferential direction, and thereby it is possible to stabilize combustion even further.

As shown in FIGS. 5 and 6, in another embodiment, the middle-flow-passage forming portion 20 includes a plurality of middle ducts 25 which are positioned on the downstream side of each of the first burner cylinders 3 and which are in communication with the interior space 7 of the plurality of first burner cylinders 3. For instance, the middle ducts 25 each may have an upstream end portion having a cylindrical shape and connected to the first burner cylinder 3, and a downstream end portion having a substantially rectangular shape positioned on the side of the combustion chamber 55.

Further, with this configuration, the distance from the center axis O of the combustor 50 to a radially inner portion of each middle duct 25, with respect to the radial direction of the combustor 50, is not uniform in the circumferential direction.

With the above configuration, of the middle ducts 25 positioned downstream of the combustor 50, the distance from the center axis O of the combustor 50 to a radially inner portion of each middle duct 25 is not uniform in the circumferential direction. Accordingly, it is possible to form longitudinal vortices in the configuration where the middle ducts 25 are provided to bring the first burner cylinders 3 and the combustion chamber 55 of the combustor 50 into communication, and stabilize combustion.

Herein, with reference to FIGS. 2 to 4, 6, and 7, the embodiment of the middle-flow-passage forming portion 20 will be described in detail.

Figure 3:
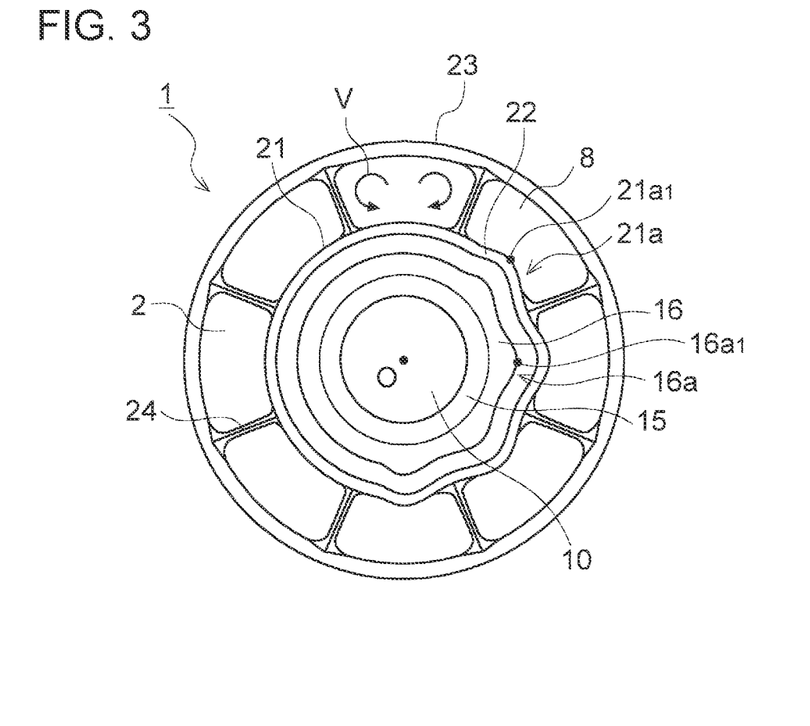
FIG. 3 is a diagram illustrating a modified example of FIG. 2.
Figure 4:
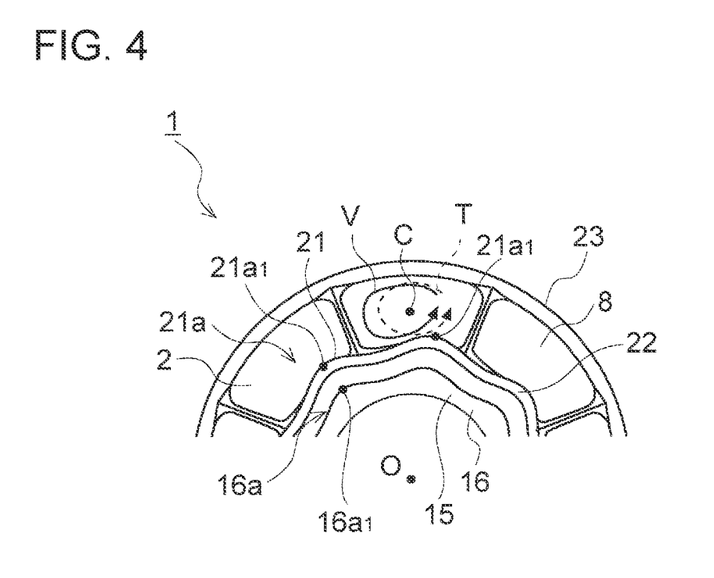
FIG. 4 is a diagram illustrating another modified example of FIG. 2.

FIGS. 3 and 4 are each a diagram showing a modified example of the embodiment shown in FIG. 2 (the configuration including the inner ring 22 and the outer ring 23). FIG. 7 is a diagram showing a modified example of the embodiment shown in FIG. 6 (the configuration including the middle duct 25). FIGS. 4 and 7 illustrate a part of the middle-flow-passage forming portion 20.

As shown in FIGS. 2 to 4 and 6, the inner peripheral wall 21 of the middle-flow-passage forming portion 20 has an uneven portion $21a$ with respect to the circumferential direction. Further, hereinafter, the uneven portion $21a$ and a vertex portion $21a_1$ disposed on the inner peripheral wall 21 of the middle-flow-passage forming portion 20 will be described. Nevertheless, instead of the uneven portion $21a$ and the vertex portion $21a_1$ on the inner peripheral wall 21, or in addition to the uneven portion $21a_1$ and the vertex portion $21a_1$, an uneven portion $16a$ and a vertex portion $16a_1$ of the flange 16 may have the same configuration.

In a configuration example shown in FIGS. 2 and 6, the inner peripheral wall 21 of the middle-flow-passage forming portion 20 includes a plurality of uneven portions $21a$ in the circumferential direction, and the vertex points $21a_1$ of the uneven portions $21a$ are provided corresponding to the first burner cylinders 3. That is, as many uneven portions $21a$ as the first burner cylinders 3 are provided. Further, the uneven portions $21a$ may be disposed at regular intervals in the circumferential direction. In this case, besides improving the flame stability in the combustion chamber 55, it is possible to form the plurality of first burner cylinders into the same shape and thereby improve the manufacturability.

In another configuration example shown in FIG. 3, the plurality of uneven portions $21a$ are provided in the circumferential direction, and the number of vertex points $21a_1$ of the uneven portions $21a$ is smaller than the number of the first burner cylinders 3. Further, the uneven portions $21a$ may be disposed unevenly in the circumferential direction. For instance, the uneven portions $21a$ may be disposed only in a half region in the circumferential direction. Accordingly, it is possible to make the radial flow velocity of the flow along the inner peripheral wall 21 more uneven in the circumferential direction, and improve the flame stability in the combustion chamber 55 more effectively.

As described above, in a case where the burner assembly 1 includes the first swirler 5 (see FIGS. 1 and 5), the inner peripheral wall 21 of the middle-flow-passage forming portion 20 may be configured such that the circumferential position of the vertex portion $21a_1$ of the uneven portion $21a$ where the distance from the center axis O of the combustor 50 is offset toward the downstream with respect to the swirl flow T along the inner peripheral wall 21 formed by the first swirler 5, from the swirl center C of the first swirler 5 positioned on the upstream side of the circumferential position (upstream side with respect to the axial direction of the combustor 50).

With the above configuration, the circumferential position of the vertex portion $21a_1$ of the uneven portion $21a$ disposed on the inner peripheral wall 21 is offset toward downstream with respect to the swirl flow T along the inner peripheral wall 21, with respect to the swirl center C of the first swirler 5. Accordingly, it is possible to form the above described longitudinal vortices V effectively, through mutual effect between the swirl component due to the first swirler 5 and the longitudinal vortex component due to the unevenness of the inner peripheral wall 21.

In a configuration example shown in FIG. 7, a radially inner portion of the middle ducts 25 has such a shape that, from a first end 21A toward a second end 21B in the circumferential direction, the distance from the center axis O of the combustor 50 to the radially inner portion of the middle duct 25 increases gradually. Accordingly, it is possible to form the above described longitudinal vortices V with the radially inner portion of the middle duct 25, without increasing the complexity of the shape of the middle duct 25.

With the above configuration, it is possible to form the above described longitudinal vortices effectively, with the uneven portions $21a$ of the inner peripheral wall 21 of the middle-flow-passage forming portion 20. That is, the flow along the uneven portion $21a$ of the inner peripheral wall 21 generates longitudinal vortices V within a plane orthogonal to the axial direction of the first burner cylinder 3. For instance, a longitudinal vortex V is a flow that flows outward in the radial direction along the oblique surface of the protruding portion, and then returns inward in the radial direction at the outer peripheral wall 26 of the middle-flow-passage forming portion 20, within a plane orthogonal to the axial direction of the first burner cylinder 3.

With the longitudinal vortices V formed by the uneven portion $21a$, on the downstream side of the middle-flow-passage forming portion 20, mixing of the flow from the first burner cylinder 3 and the gas flow in the combustion chamber 55 is promoted, which makes it possible to improve the flame stability in the burner assembly 1.

Further, as shown in FIG. 7, the radially inner portion of the middle duct 25 may have such a shape that, from a first end 21A toward a second end 21B in the circumferential direction, the distance from the center axis O of the combustor 50 to the middle duct 25 increases gradually.

With the above configuration, the radially inner portion of the middle duct 25 has such a shape that, from a first end 21A toward a second end 21B in the circumferential direction, the distance from the center axis O of the combustor 50 to the middle duct 25 increases gradually, and thus it is possible to form the above described longitudinal vortices V with the radially inner portion of the middle duct 25 without increasing the complexity of the shape of the middle duct 25.

As described above, in a case where the burner assembly 1 includes the first swirler 5, the radially inner portion of the middle duct 25 may have such a shape that the distance from the center axis O gradually increases toward the downstream side with respect to the swirl flow T along a portion of the middle duct 25 formed by the first swirler 5.

In this configuration, the radially inner portion of the middle duct 25 has such a shape that, toward the downstream side with respect to the swirl flow T along the portion formed by the first swirler 5, the distance from the center axis O of the combustor 50 increases gradually. Accordingly, it is possible to form the above described longitudinal vortices V effectively, through mutual effect between the swirl component formed due to the first swirler 5 and the longitudinal vortex component due to the radially inner portion of the middle duct 25.

Next, with reference to FIG. 8, the configuration of a gas turbine 100, which is an example of application of the above described burner assembly 1, will be described. Nevertheless, application of the above described burner assembly 1 is not limited to the gas turbine 100.

Figure 8:
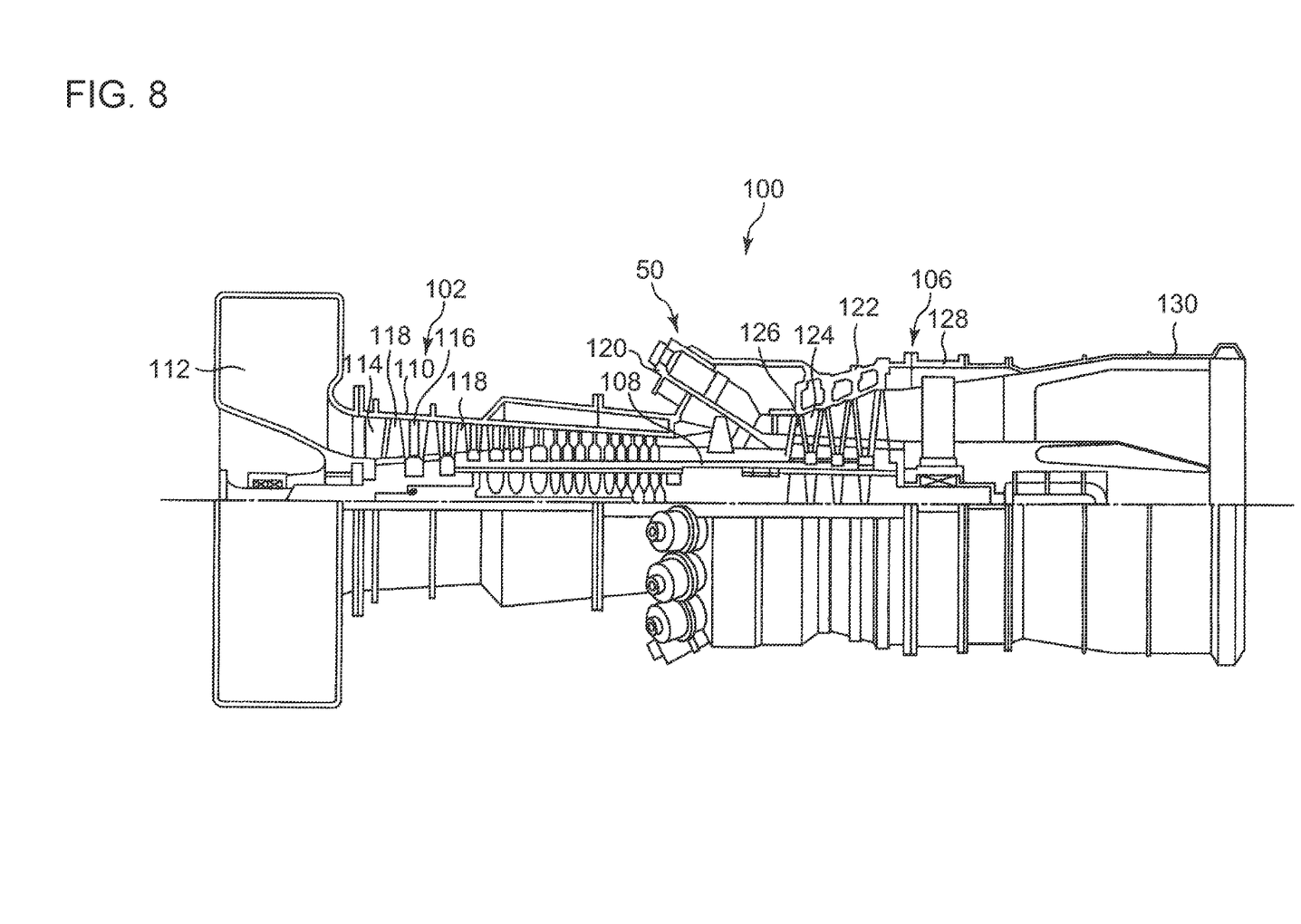
FIG. 8 is a schematic configuration diagram of a gas turbine according to an embodiment.

Further, FIG. 8 is a schematic configuration diagram of a gas turbine 100 according to an embodiment.

As shown in FIG. 8, the gas turbine 100 according to an embodiment includes a compressor 102 for producing compressed air that serves as an oxidant, a combustor 50 for producing combustion gas using the compressed air and fuel, and a turbine 106 configured to be driven by combustion gas to rotate. In the case of the gas turbine 100 for power generation, a generator (not illustrated) is connected to the turbine 106, so that rotational energy of the turbine 106 generates electric power.

The configuration example of each component of the gas turbine 100 will be described specifically.

The compressor 102 includes a compressor casing 110, an air inlet 112 for introducing air, disposed on an inlet side of the compressor casing 110, a rotor 108 disposed so as to penetrate through both of the compressor casing 110 and the turbine casing 122 described below, and a variety of vanes disposed in the compressor casing 110. The variety of vanes includes an inlet guide vane 114 disposed adjacent to the air inlet 112, a plurality of stator vanes 116 fixed to the compressor casing 110, and a plurality of rotor blades 118 implanted on the rotor 108 so as to be arranged alternately with the stator vanes 116. The compressor 102 may include other constituent elements not illustrated in the drawings, such as an extraction chamber. In the above compressor 102, the air introduced from the air inlet 112 flows through the plurality of stator vanes 116 and the plurality of rotor blades 118 to be compressed to turn into compressed air having a high temperature and a high pressure. The compressed air having a high temperature and a high pressure is sent to the combustor 50 in a latter stage from the compressor 102.

The combustor 50 is disposed in a casing 120. As illustrated in FIG. 1, a plurality of combustors 50 may be disposed in an annular shape centered at the rotor 108 inside the casing 120. The combustors 50 are supplied with fuel and the compressed air produced in the compressor 102, and combusts the fuel to produce combustion gas that serves as a working fluid of the turbine 106. The combustion gas is sent to the turbine 106 in a latter stage from the combustors 50. The configuration example of the combustors 50 will be described later in detail.

The turbine 106 includes a turbine casing 122 and a variety of vanes disposed inside the turbine casing 122. The variety of vanes includes a plurality of stator vanes 124 fixed to the turbine casing 122 and a plurality of rotor blades 126 implanted on the rotor 108 so as to be arranged alternately with the stator vanes 124. The turbine 106 may include other constituent elements, such as outlet guide vanes and the like. In the turbine 106, the rotor 108 is rotary driven as the combustion gas passes through the plurality of stator vanes 124 and the plurality of rotor blades 126. Accordingly, the generator connected to the rotor 108 is driven.

An exhaust chamber 130 is connected to the downstream side of the turbine casing 122 via an exhaust casing 128. The combustion gas having driven the turbine 106 passes through the exhaust casing 128 and the exhaust chamber 130 before being discharged outside.

Next, with reference to FIG. 9, the specific configuration of the combustor 50 according to an embodiment will be described. FIG. 9 is a cross-sectional view of a combustor 50 according to an embodiment.

Figure 9:
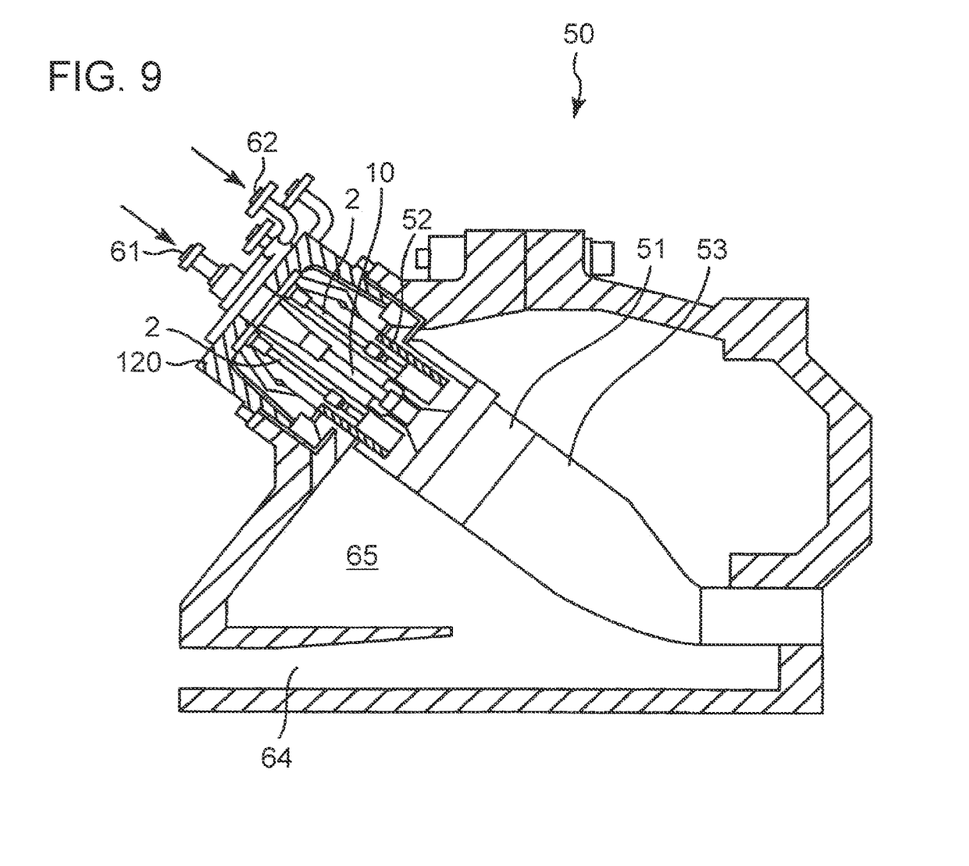
FIG. 9 is a cross-sectional view of a combustor according to an embodiment.

As shown in FIG. 9, a plurality of combustors 50 according to an embodiment are disposed in an annular shape centered at the rotor 108 (see FIG. 8). Each combustor 50 includes a combustor liner 51 disposed in a combustor casing 65 defined by the casing 120, the second burner 10 disposed in the combustor liner 51, and a plurality of first burners (premixing combustion burners) 2 disposed in the combustor liner 51. The combustor 50 may include other constituent elements such as a bypass line (not illustrated) for allowing the combustion gas to bypass.

For instance, as shown in FIG. 9, the combustor liner 51 includes a combustor basket 52 disposed around the second burner 10 and the plurality of first burners 2, and a transition piece 53 connected to a tip portion of the combustor basket 52.

The second burner 10 is disposed along the center axis of the combustor liner 51. The plurality of first burners 2 are arranged at a distance from one another so as to surround the second burner 10.

The second burner 10 includes a second nozzle 11 (see FIG. 1 or 5) connected to a fuel port 61, a second burner cylinder 12 (see FIG. 1 or 5) disposed so as to surround the second nozzle 11, and a swirler 13 (see FIG. 1 or 5) disposed on the outer periphery of the second nozzle 11.

The first burner 2 includes a first nozzle 4 (see FIG. 1 or 5) connected to a fuel port 62, a first burner cylinder 3 (see FIG. 1 or 5) disposed so as to surround the first nozzle 4, and a swirler 5 (see FIG. 1 or 5) disposed on the outer periphery of the first nozzle 4.

In the combustor 50 having the above configuration, the compressed air having a high temperature and a high pressure produced in the compressor 102 is supplied into the combustor casing 65 from a casing inlet 64, and then flows into the first burner 2 from the combustor casing 65. Then, the compressed air and fuel supplied from the fuel port 62 are premixed in the first burner 2. Further, the compressed air and fuel injected from the second burner 10 via the fuel port 61 are mixed in the combustor liner 51, and ignited by a pilot light (not illustrated) and combusted, whereby combustion gas is generated. At this time, a part of the combustion gas diffuses to the surroundings with flames, which ignites the air-fuel mixture flowing into the combustor liner 51 from each first burner 2 to cause combustion.

As described above, according to at least some embodiments of the present invention, the flame position inside the combustion chamber 55 is fixed in the circumferential direction, and it is possible to stabilize combustion. Further, through stabilization of combustion, it is possible to suppress combustion oscillation and abnormal heat generation.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Burner assembly
2 First burner
3 First burner cylinder
4 First nozzle
5 First swirler
6 Fuel injection hole
7 Interior space
8 Middle flow passage
10 Second burner
11 Second nozzle
12 Second burner cylinder
13 Second swirler
14 Fuel injection hole
15 Cone portion
16 Flange
20 Middle-flow-passage forming portion
21 Inner peripheral wall
21a Uneven portion
22 Inner ring
23 Outer ring
24 Stagnation suppressing part
25 Middle duct
26 Outer peripheral wall
50 Combustor
51 Combustor liner
54 Base plate
55 Combustion chamber
65 Combustor casing
100 Gas turbine
102 Compressor
106 Turbine
108 Rotor
124 Stator vane
126 Rotor blade

The invention claimed is:

1. A bunter assembly for a combustor, comprising:
a plurality of first nozzles arranged in a circumferential direction of the combustor;
a plurality of first burner cylinders each of which extends axially beyond a downstream end of a corresponding one of the plurality of first nozzles to accommodate the corresponding one of the plurality of first nozzles; and
a middle-flow-passage forming portion which is disposed downstream of the plurality of first nozzles and which is connected to a downstream end of the plurality of first burner cylinders and which forms a middle flow passage through which a combustion chamber of the combustor is in communication with an interior space of each of the plurality of first burner cylinders,
wherein the middle-flow-passage forming portion includes an inner peripheral wall disposed on a radially inner side of the combustor, the inner peripheral wall being a continuous wall circumscribing a center axis of the combustor and formed such that a distance from the center axis of the combustor to the inner peripheral wall is uneven with respect to the circumferential direction within a cross section orthogonal to an axial direction of the combustor, at an axial position on a downstream side of the downstream end of each of the plurality of first nozzles.

2. The burner assembly for a combustor according to claim 1, further comprising:
a second nozzle disposed so as to be surrounded by the plurality of first nozzles;
a second burner cylinder accommodating the second nozzle; and
a cone portion connected to a downstream end of the second burner cylinder, the cone portion having a diameter which increases toward a downstream side from a diameter of the downstream end of the second burner cylinder,
wherein the cone portion includes a flange which is positioned on a downstream end of the cone portion and which extends outward in a radial direction of the combustor, and
wherein the flange has, with respect to the radial direction of the combustor, a height which is uneven in the circumferential direction.

3. The burner assembly for a combustor according to claim 1, wherein the middle-flow-passage forming portion includes:
an inner ring which is disposed on a downstream side of the plurality of first burner cylinders and which extends in the circumferential direction; and
an outer ring which is disposed on a downstream side of the plurality of first burner cylinders and on a radially outer side of the inner ring and which extends in the circumferential direction so as to form the middle flow passage having an annular shape between the inner ring and the outer ring,
wherein a distance from the center axis of the combustor to the inner ring is uneven with respect to the circumferential direction.

4. The burner assembly for a combustor according to claim 1,
wherein the middle-flow-passage forming portion includes a plurality of middle ducts each of which is disposed on a downstream side of a corresponding one of the plurality of first burner cylinders, and is in communication with an interior space of the corresponding one of the plurality of first burner cylinders, and
wherein a radially inner portion of each middle duct with respect to a radial direction of the combustor is configured such that a distance from the center axis of the combustor to the radially inner portion of the middle duct is uneven with respect to the circumferential direction.

5. The burner assembly for a combustor according to claim 1, wherein the inner peripheral wall of the middleflow-passage forming portion has a projection including a vertex at which the distance from the center axis becomes a local maximum.

6. The burner assembly for a combustor according to claim 5, further comprising:
a plurality of first swirlers each of which is disposed on a corresponding one of the first burner cylinders, for imparting a swirl to an air flow flowing through the corresponding first burner cylinder,
wherein the inner peripheral wall is configured such that a circumferential position of the vertex of the uneven portion at which the distance from the center axis of the combustor is maximum is offset toward a downstream side of a swirl flow along the inner peripheral wall formed by the first swirler from a swirl center of the first swirler disposed on an upstream side of the circumferential position.

7. The burner assembly for a combustor according to claim 4, wherein the radially inner portion of each of the middle ducts has such a shape that a distance from the center axis of the combustor to the radially inner portion of the middle duct increases gradually from a first end side toward a second end side in the circumferential direction.

8. The burner assembly for a combustor according to claim 7, further comprising:
a plurality of first swirlers each of which is disposed on a corresponding one of the first burner cylinders, for imparting a swirl to an air flow flowing through the corresponding first burner cylinder,
wherein the radially inner portion of each of the middle ducts has such a shape that a distance from the center axis increases gradually toward a downstream side of a swirl flow along the radially inner portion of the middle duct formed by the first swirler.

9. The burner assembly according to claim 1,
wherein each of the first nozzles comprises a premixing nozzle configured to combust a premixed air-fuel mixture of an air flow supplied to the first burner cylinder and a fuel supplied from the first nozzle.

10. A combustor comprising:
the burner assembly according to claim 1; and
a combustor liner accommodating the burner assembly.

11. A gas turbine, comprising:
a compressor;
the combustor according to claim 10 configured to combust fuel by using compressed air generated by the compressor; and
a turbine driven by combustion gas generated by the combustor.

12. The burner assembly for a combustor according to claim 1,
wherein the middle flow passage has an annular shape whose radially inner boundary is defined by the inner peripheral wall where the distance from the center axis of the combustor to the inner peripheral wall is not constant with respect to the circumferential direction.

13. The burner assembly for a combustor according to claim 1,
wherein each of the plurality of first burner cylinders extends axially to pass through a plane that includes the downstream ends of the plurality of first nozzles.

14. The burner assembly for a combustor according to claim 1,
wherein the distance from the center axis of the combustor to the inner peripheral wall changes depending on a circumferential position thereof.

* * * * *